Patented Mar. 20, 1923.

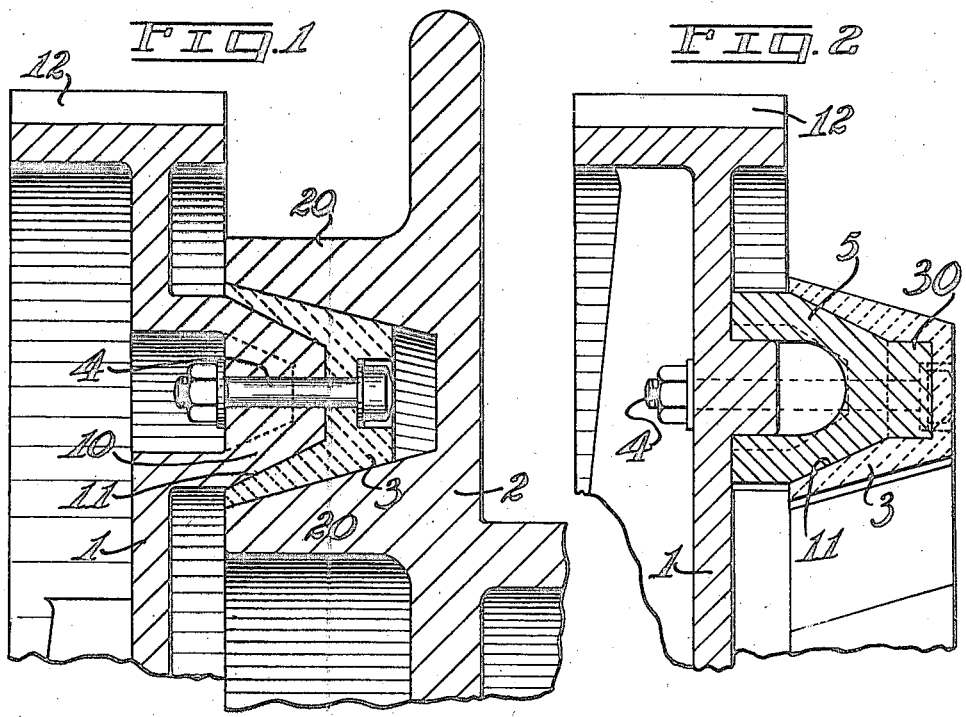
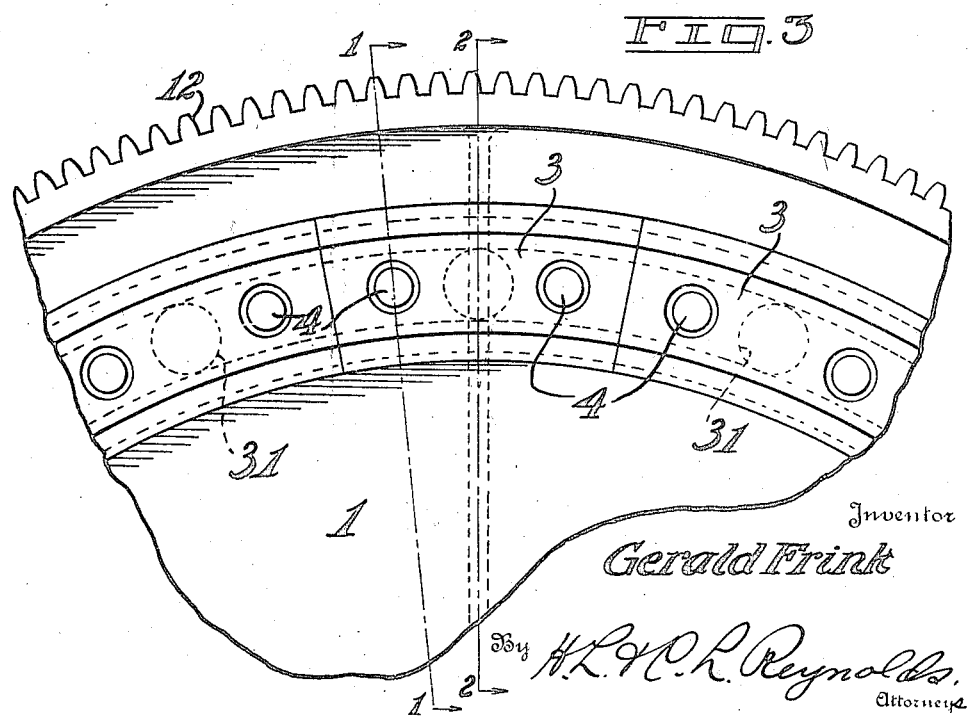

1,449,171

UNITED STATES PATENT OFFICE.

GERALD FRINK, OF SEATTLE, WASHINGTON.

FRICTION CLUTCH.

Application filed September 24, 1921. Serial No. 502,854.

*To all whom it may concern:*

Be it known that I, GERALD FRINK, a citizen of the United States of America, and resident of the city of Seattle, in the county of King and State of Washington, have invented certain new and useful Improvements in Friction Clutches, of which the following is a specification.

My invention relates to friction clutches and particularly to the type of friction clutches which are quite generally used to drive the drums of friction drum engines.

The object of my invention is to provide a renewable friction member of a type of construction such that the first cost of the friction blocks may be lessened and also so that the renewal of these surfaces after wear may be quickly and cheaply done.

Another object is to provide a friction surface of superior quality.

The features of the device which I believe to be new and upon which I desire to secure a patent will be particularly pointed out in the claims terminating this specification.

In the accompanying drawings I have shown a preferred form of construction for my device.

Figure 1 is a section taken through one side of the two revolving main members which it is designed to connect and drive through frictional engagement.

Figure 2 is a similar section showing the modification of construction which is adopted when the device is applied to an engine already built.

Figure 3 is a face view of the gear to which the friction blocks are secured.

The construction illustrated in Figure 1 is that which would preferably be adopted when the device is applied to the friction clutch at the time of construction, while Figure 2 illustrates the construction adopted when applied to friction clutches after construction. The member 1 represents a portion of the gear wheel by which a drum of a friction drum engine is turned, while 2 repsents one head of the drum.

The type of friction most generally employed in driving drums of this sort consists of a circular, face-projecting flange or ridge carried either by the gear or by the drum and a complemental groove carried by the other member into which said ridge or flange enters.

In applying my invention to a friction driving clutch for such a drum at the time of construction, the face projecting rib 10 is formed integrally with the web of the gear. This rib is given inclined outer side faces, as 11. The other member 2 which as illustrated is the head of the drum, is given two circular flanges 20 spaced apart so as to form between them a groove or channel for the reception of the complemental friction member carried by the gear 12.

The rib 10 carried by the gear has secured thereto a series of friction blocks 3, which blocks are made in V-shaped cross-section, the inner surfaces of the angle between the sides of the V being made to fit the outer inclined surfaces 11 of the rib 10 and the outer inclined surfaces of the V being made to fit the groove of the drum.

These blocks are made of whatever length is convenient for manufacture and handling. They are secured to the rib 10, as by using bolts 4 which are customarily employed for securing the usual friction blocks. The friction blocks 3 of my invention may be provided with any suitable recesses for the reception of interlocking projections carried by the rib 10. I have illustrated the use of circular bosses 30 which enter corresponding recesses 31 in the friction blocks.

In applying the device to an engine already constructed, a cast iron rib or ring 5 is secured to the gear 1, this being given an exterior shape such as has just been described and which adapts it to fit the friction blocks. This ring may be made in sections or continuous, as is found most desirable. The blocks applied in the one case will also fit the other.

The material of which these friction blocks are made is preferably one which may be shaped by molding and also one possessing heat resistance heat and wearing qualities which adapt it to the particular use. A material which I have found well adapted for this purpose is one in which asbestos forms a considerable element. Such material may be accurately molded and shaped to form and also wears well, being resistant to temperature as well as to wearing away.

What I claim as my invention is:

1. A renewable friction block for clutches comprising a block of molded friction material having a V-shaped cross section and being curved lengthwise to form a segment of a circle.

2. A renewable friction block for clutches comprising a block of friction material containing asbestos molded to a V-shaped cross-section and curved lengthwise to form a segment of a circle.

3. A friction clutch comprising two rotative members which are to be frictionally connected, one of said members having a face projecting circular rib having inclined side faces, a series of friction blocks having a V-shaped cross section adapted to fit over said rib, the other member having a circular groove adapted to fit the outer side faces of said blocks.

Signed at Seattle, King County, Washington, this 19 day of September, 1921.

GERALD FRINK.